Sept. 1, 1959   E. L. JONES   2,901,879
NUT HARVESTER

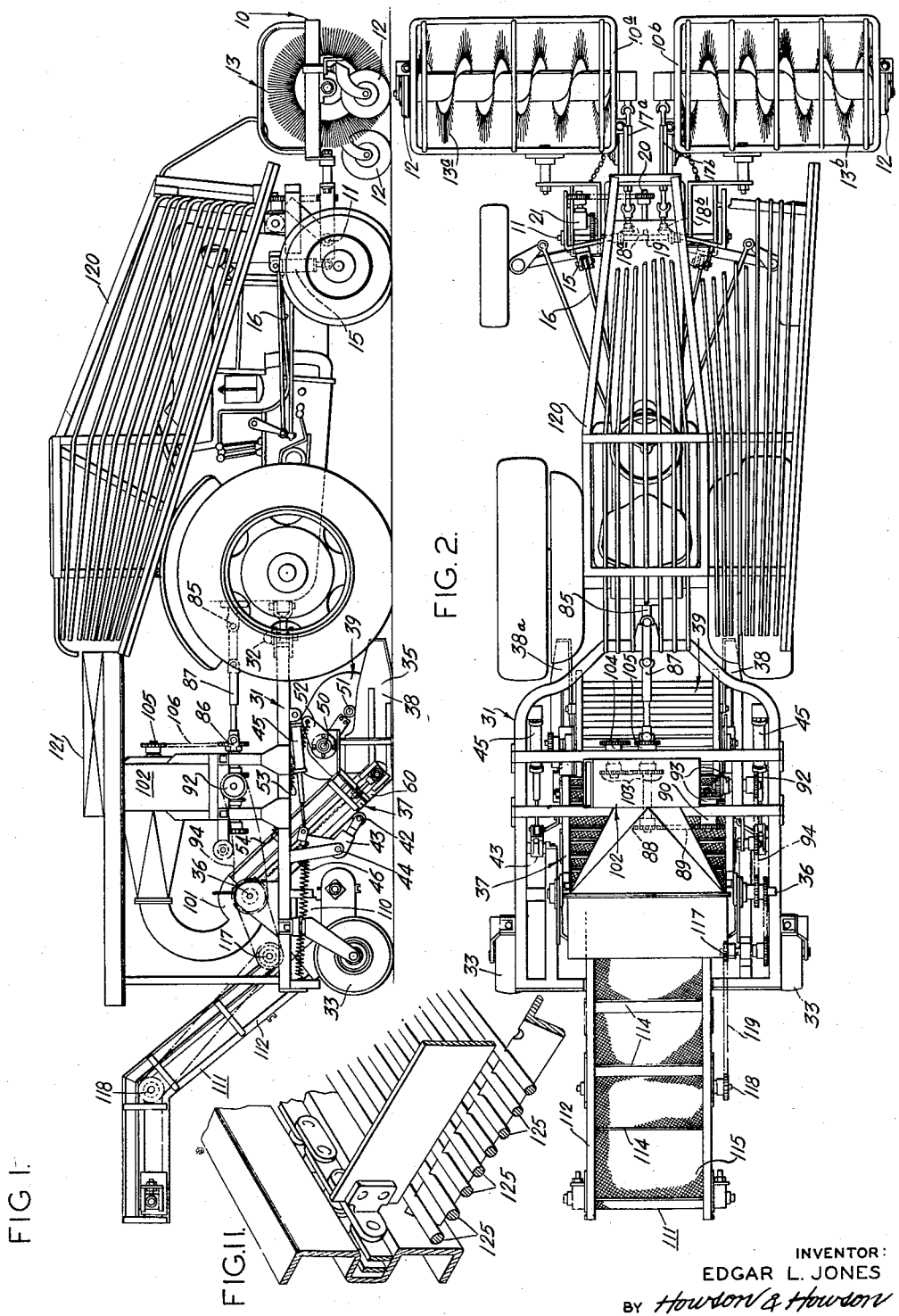

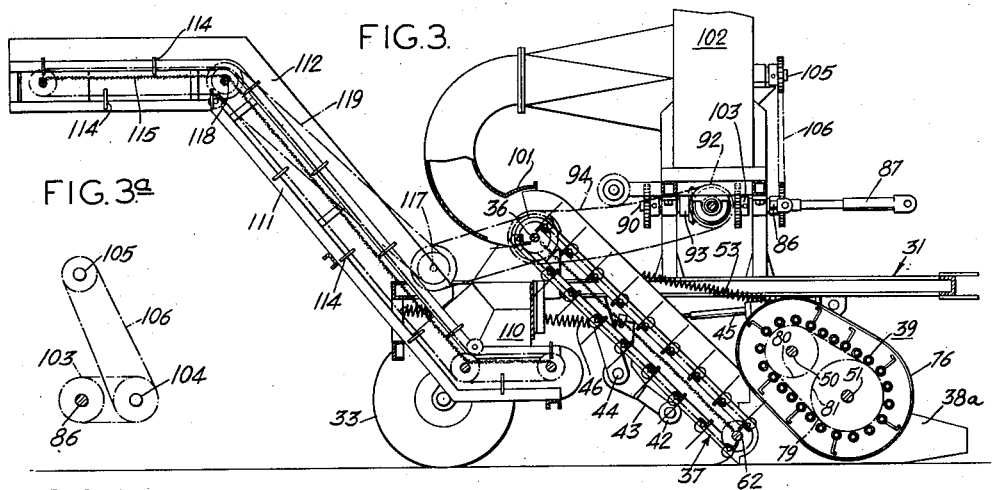
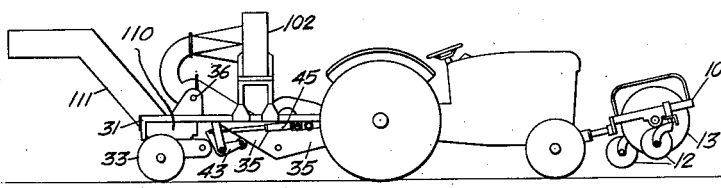
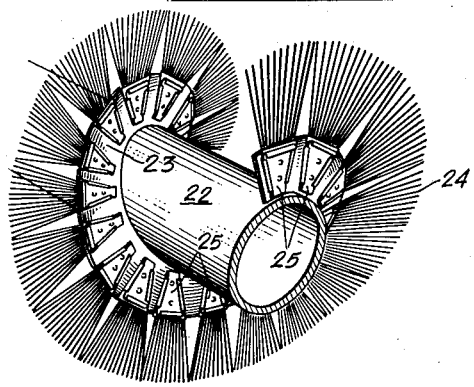
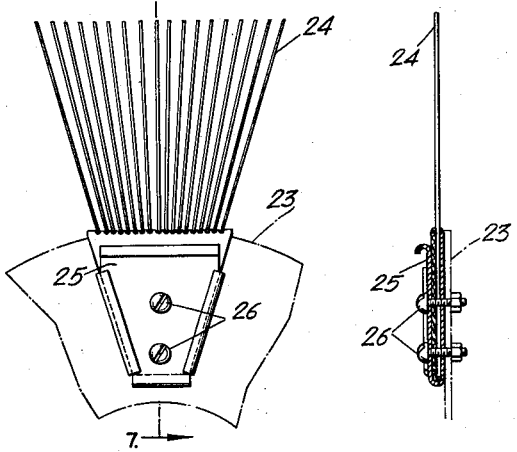
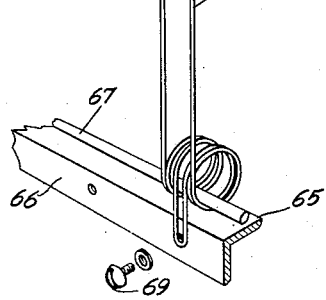

Filed Nov. 21, 1956   3 Sheets-Sheet 3

INVENTOR
EDGAR L JONES
BY Howson &
Howson
ATTYS

United States Patent Office 2,901,879
Patented Sept. 1, 1959

2,901,879

NUT HARVESTER

Edgar L. Jones, Evansville, Ind.

Application November 21, 1956, Serial No. 623,680

6 Claims. (Cl. 56—328)

The present invention relates to a machine for harvesting nuts, and has particular application to a tractor-mounted unit for harvesting tung nuts, and other varieties of nuts having similar characteristics.

Prior to the present invention, nuts have been harvested by hand. While this is satisfactory for small operations, the price of labor precludes large scale nut harvesting operations. The conventional pick-up machines for other produce are not practical for harvesting nuts since the machines are of limited capacity and are designed for harvesting produce in open fields. When harvesting nuts, the nuts are intermingled with twigs, leaves, small branches from the trees, etc. If it were attempted to use conventional harvesting machines for harvesting nuts, the leaves, twigs, and other foreign matter would foul the operating mechanism of the machine.

With the foregoing in mind, the present invention contemplates a nut harvester which has a large capacity, and which is capable of picking up nuts and rejecting twigs and other foreign matter.

More particularly, the invention contemplates a harvesting machine which is capable of being embodied or mounted on a conventional tractor and is susceptible of one man operation.

More specifically, the invention contemplates a device which sweeps the nuts from a wide area into a narrow path, and which subsequently picks up the path of nuts, separating the twigs, dirt, leaves and like foreign matter from the nuts and conveying the nuts into position for depositing in a wagon or the like.

The invention also contemplates a machine which is of simple construction, and is fully effective in operation and use.

All of the objects and the various features and details of the construction and operation of the invention are more fully set forth hereinafter with reference to the accompanying drawings wherein:

Fig. 1 is a side elevational view of apparatus made in accordance with the present invention;

Fig. 2 is a plan view of the apparatus shown in Fig. 1;

Fig. 3 is an enlarged fragmentary elevational view with parts broken away and shown in section of the machine illustrating the operation of the nut pick-up section of the machine;

Fig. 3a is a detached schematic of the driving connections to the blower;

Fig. 4 is an elevational view on a reduced scale with details omitted of the apparatus with the guard removed showing the ground engagement elements elevated out of engagement with the ground;

Fig. 5 is an enlarged fragmentary perspective view of the windrower brush mounted at the front of the apparatus;

Fig. 6 is an enlarged detail showing the construction of the windrower brush;

Fig. 7 is a sectional view taken on the line 7—7 of Fig. 6;

Fig. 8 is an enlarged fragmentary perspective view showing the construction of the tines making up the flights of the pick-up header elevator in the body of the apparatus;

Fig. 11 is a fragmentary perspective view of a modification of a conveyor base member.

Figure 9:
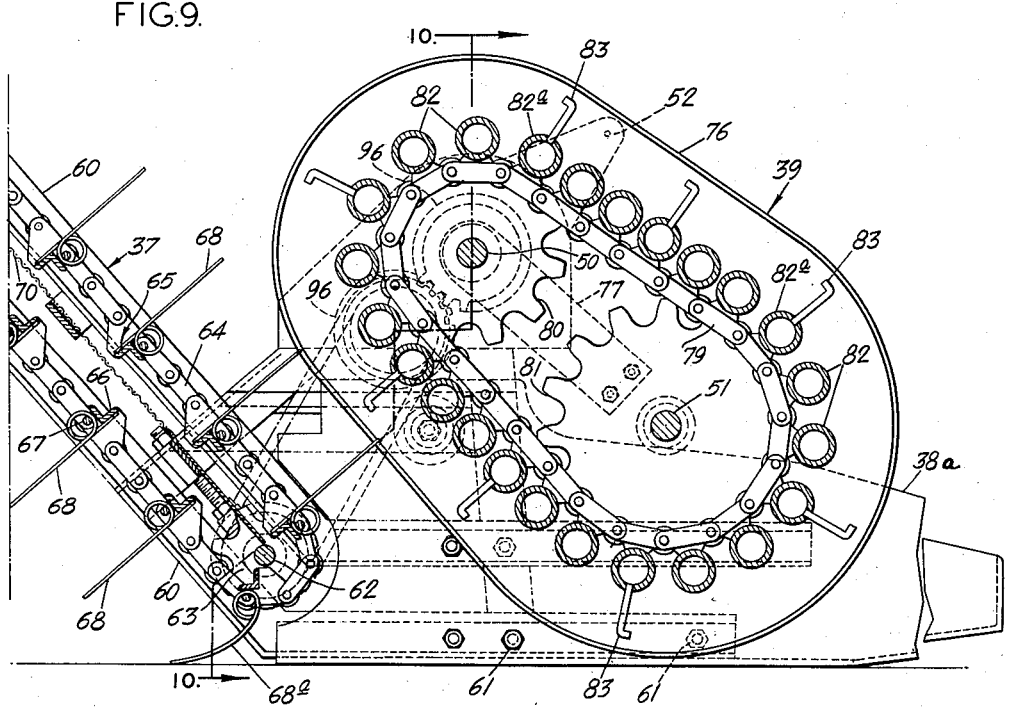
Fig. 9 is an enlarged fragmentary longitudinal section through the pick-up header taken on the line 9—9 of Fig. 10 and showing its mode of operation.

Referring now to the drawings, the apparatus comprises a windrower brush which is attached to the forward end of a tractor and operates to brush a relatively wide swath, for example 7 feet, of nuts into a narrow path intermediate the wheels of the tractor. The tractor body passes over the path of nuts and the nuts are picked up by a pick-up header mounted on a framework behind the tractor. The pick-up header slides on the ground to follow the contour thereof and effectively picks up the nuts in the path formed by the windrower brush. The nuts are carried upwardly by a pick-up header elevator and at the upper extremity of the elevator, the nuts are discharged into a hopper, the leaves and other foreign matter being separated by an exhaust hood surrounding the upper extremity of the pick-up header elevator. From the hopper, the nuts are conveyed upwardly by a delivery conveyor which is operable to deposit the nuts in a wagon trailing behind the framework.

In the illustrated embodiment of the invention, the windrower brush is driven by a power take-off from the crank shaft of the tractor; and the pick-up header, delivery conveyor, and blower for exhausting leaves and other foreign matter are driven from the power take-off at the rear of the tractor. If desired, the brush may, in the alternative, be driven from the rear power take-off of the tractor. The brush and the pick-up header have connections to the hydraulic system on the tractor which afford elevation of these elements when the harvester is not in use, for example when traveling to and from the nut grove or orchard. A guard may be provided for the tractor to protect the operator from low hanging limbs and the like during the harvesting operation. The apparatus automatically sweeps the nuts into a narrow path, picks up the nuts, separates the nuts from the foriegn matter, and deposits the nuts free of dirt, twigs, leaves, etc. in a wagon or other vehicle.

Referring now to the drawings and more particularly to Figs. 1 and 2 thereof, a windrower brush 13 is mounted on a frame 10 which is pivoted as indicated at 11 to the tractor structure. The frame 10 travels on wheels 12 so that the brush 13 is in engagement with the ground. The wheels 12 may be disengaged from the ground, as shown in Fig. 4 by a hydraulic cylinder 15 which is connected to the hydraulic system of the tractor for example by a conduit 16. As shown in Fig. 2, the frame 10 is in two sections 10$^a$ and 10$^b$, each mounting a brush section 13$^a$ and 13$^b$ respectively for rotation about a substantially horizontal axis. The brushes 13$^a$ and 13$^b$ are of respectively opposite helical form and are rotated by connecting shafts 17$^a$ and 17$^b$ having universal connections to miter gears 18$^a$ and 18$^b$ which are driven by a bottom shaft 19. The bottom shaft is driven from the tractor crank shaft power take-off 20 through a gear reduction box 21 as shown in Fig. 2. Thus, as the tractor advances, the brushes 13$^a$ and 13$^b$ are rotated to sweep the nuts forwardly into a narrow path intermediate the wheels of the tractor.

The construction of the brushes 13$^a$ and 13$^b$ is shown in Figs. 5 to 7 inclusive and affords ready replacement of the brush fingers in the event of damage or excessive wear. To this end, each brush comprises a tubular shaft 22 having a helical fin 23 mounted thereon. The brush fingers 24 are mounted in groups or hands in a bracket 25 which is bolted or otherwise secured to the fin 23 as indicated at 26. The fingers 24 are disposed fan-like from the bracket, and the outer fingers of each hand of fingers are in engagement with the outer fingers of the adjacent hand to thereby provide a continuous helicoid brush which operates to sweep the nuts into a path intermediate the brush sections 13ª and 13ᵇ and centrally of the windrower.

Means is provided at the trailing end of the tractor to pick up the nuts, separate the foreign matter therefrom, and deposit the nuts in a wagon or other suitable collecting means. To this end, a trailer chassis 31 is hitched to the hitch bar of the tractor as indicated at 32 and is operable to be drawn by the tractor on trailer wheels 33. Of course a straight axle and ball hitch may be substituted for the form of hitch shown at 32. In the present instance, the wheels 33 are mounted on swivels to provide greater maneuverability of the trailer chassis 31.

A pick-up header assembly 35 is mounted on the chassis 31 for pivotal movement between a ground-engaging position and an elevated position. To this end, the pick-up header assembly is supported on the chassis by an axle 36 mounted for rotation at an elevated station above the ground. The assembly comprises a pick-up header elevator 37 depending downwardly from the axle 36 and supported on the ground by slide shoes 38 and 38ª mounted at opposite sides of the chassis 31. Intermediate the slide shoes 38 and 38ª is positioned an auxiliary baffle means, preferably in the form of a pick-up conveyor 39 which engages the nuts and the like on the ground intermediate the slide shoes and insures that the nuts are engaged with the pick-up header elevator 37.

Means is provided to elevate the pick-up header assembly 35 to disengage the slide shoes 38 and 38ª from the ground, as shown in Fig. 4. To this end, the assembly 35, or more specifically the supporting structure 60 of the pick-up header elevator 37 is engaged by a roller 42 mounted on a bell crank 43 pivoted to the trailer chassis 31 as indicated at 44. A hydraulic lifting linkage 45 engages between the opposite end of the bell crank 43 and the chassis and is actuated by the hydraulic system of the tractor (not shown) similarly to the actuation of the cylinder 15 of the windrower assembly 10.

To insure that the pick-up header assembly follows the contour of the ground, a counterbalance spring 46 is tensioned between the opposite end of the bell crank lever 43 and the chassis framework 31. The counterbalance spring 46 thereby overcomes the weight of the pick-up header assembly 35 so that the slide shoes are free to travel along the ground surface.

The pick-up conveyor 39 is pivotally mounted relative to the slide shoes 38 and 38ª as indicated at 50, the lower end of said conveyor being supported vertically by the engagement of the bearing of the lower axle 51 with the upper edge of the slide shoes 38 and 38ª. A counterbalance is provided to resiliently support the conveyor 39 to enable it to more closely follow the contour of the ground and travel over obstructions such as rocks and the like. To this end, the conveyor is provided with an arm 52 which mounts one end of a counterbalance spring 53 which, in turn, is secured at its opposite end to the framework 60 of the pick-up header elevator 37 as indicated at 54. Thus, the conveyor 39 is resiliently supported by the spring 53 relative to the slide shoes 38 and 38ª, to allow it to ride easily over the ground surface, and likewise the slide shoes are counterbalanced by the spring 46 to follow the contour of the ground. When the hydraulic lifting linkage 45 is actuated, the pick-up header elevator 37 is pivoted on its axle 36 and the pick-up conveyor 39 follows the upward movement of the pick-up header elevator and slide shoes by reason of the engagement of the axle 51 on the upper surface of the slide shoes.

Referring to Figs. 1 and 9, the pick-up header elevator 37 comprises the rigid framework 60 pivotally mounted on the axle 36 at its upper end, and mounting the slide shoes 38 and 38ª at its lower end, indicated at 61. A shaft 62 is journaled adjacent the lower extremity of the framework 60 and mounts sprockets 63 which engage endless chains 64 of the elevator 37. The flights 65 of the elevator span between the chains 64 and comprise cross pieces in the form of angle irons 66 and rods 67 which support torsion spring tines 68, for example by bolts 69. The tines 68 of the flights 65 are susceptible of being flexed as indicated at 68ª in Fig. 9 when they engage the ground. An inclined surface 70 forms a base upon which the nuts are advanced by the flights 65 of the elevator. As indicated in Fig. 9, the base 70 is foraminous, preferably expanded metal or the like, so that as the nuts are advanced upwardly therealong, dirt and small stones adhering to the nuts are discharged through the base 70 to the ground. If desired, as shown in Fig. 11, the expanded metal base 70 and the base 115 of the delivery conveyor 11 (described below) may be replaced by ⅜ inch rods 125 spaced apart at ⅜ inch intervals to constitute a foraminous base for discharging dirt and small stones adhering to the nuts.

Figure 10:
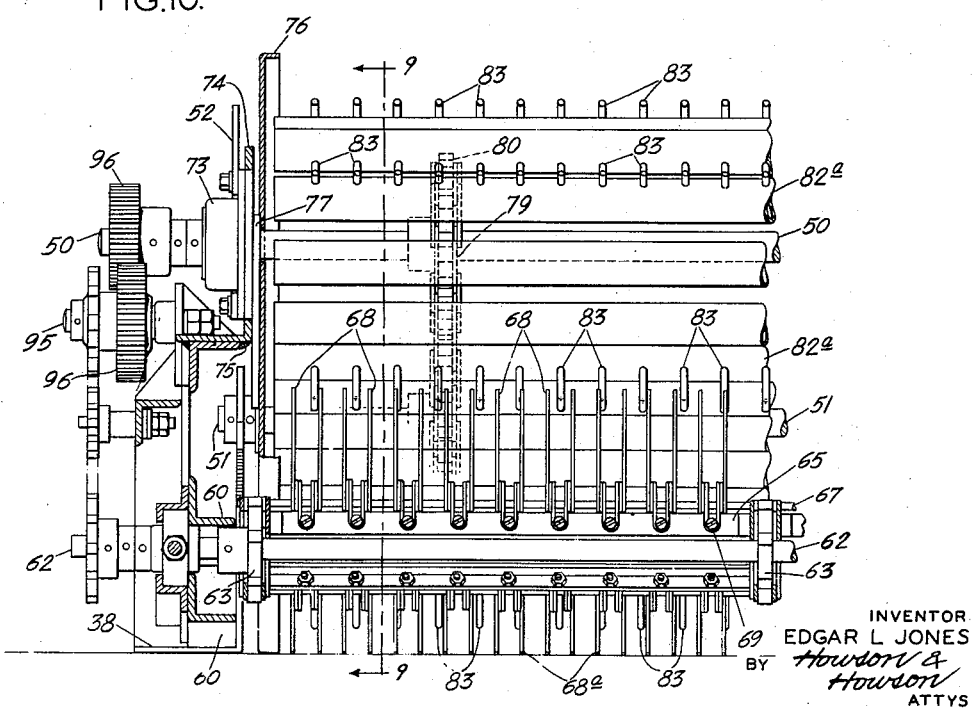
Fig. 10 is a sectional view taken on the line 10—10 of Fig. 9.

The pick-up conveyor 39 is mounted adjacent the pick-up header elevator 37 to engage the nuts and keep them from falling out from between the flights of the elevator 37. The conveyor 39 is pivotally mounted on the axle 50 so that it may be rocked upwardly thereon as indicated above. To this end, the shaft 50 is journaled in bearings 73 which, in turn, are mounted for pivotal movement in bearing brackets 74 secured to the elevator framework 60 as indicated at 75. Preferably, each bearing 73 is a ball or roller bearing, the inner race of which is mounted on the axle 50 and the outer race of which is rotatable in the bracket 74. The counterbalance arm 52 is secured to the outer race, as is the side plate 76 through a reinforcing piece 77. The conveyor 39 comprises spaced endless chains 79 trained over sprockets 80, 81 respectively on the shafts 50 and 51. The chains mount a series of tubular elements 82, selected elements 82a of which are provided with outwardly projecting drag teeth 83 as shown in Figs. 9 and 10. Thus, as the pick-up header is advanced along the path of nuts formed by the windrower assembly, the tines 68 of the pick-up elevator 37, as they disengage the ground, are free to flex upwardly and kick the nuts upwardly against the conveyor 39 from which they bounce into the space between the adjacent flights of the elevator 37. The flights then carry the nuts upwardly to the upper end of the elevator.

Means is provided to actuate the elevator 37 and the conveyor 39 from the power take-off 85 of the tractor. The power take-off 85 is connected to a shaft 86 journaled in the framework 31 of the trailer chassis by a connecting rod 87. The shaft 86 mounts a sprocket 88 which by a chain 89, drives a sprocket 90. The sprocket 90, in turn, drives a sprocket 92 by means of bevel gears 93. A chain 94 drives the shaft 36 which, in turn, actuates the elevator 37 counter-clockwise as shown in Figs. 1 and 3. Actuation of the elevator 37 by the shaft 36 rotates the shaft 62 counter-clockwise. As shown in Figs. 9 and 10, the shaft 62 is coupled to a stub shaft 95 which drives the shaft 50 clockwise by means of the gears 96. Clockwise rotation of the shaft 50 rotates the conveyor 39 in a clockwise direction to effect the operation set forth above.

Means is provided at the upper end of the pick-up elevator 37 to separate leaves and other foreign matter from the nuts on the elevator. To this end, a hood 101 surrounds the upper end of the elevator 37 and is connected to the intake of a blower 102 mounted on the framework 31. Rotation of the blower 102 sucks leaves and other light foreign matter from the nuts in the elevator 37 and discharges the foreign matter to one side of the apparatus. The blower is driven from the shaft 86 by a chain and sprocket 103 driving an idler shaft 104 which drives the blower impeller shaft 105 by means of a chain 106. Thus, the nuts are discharged from the elevator 37 relatively free of foreign matter, the dirt and small stones being discharged through the foraminous base 70 and the twigs and leaves being discharged by the blower 102.

The relatively clean nuts from the elevator are discharged into a hopper 110. The nuts are discharged from the hopper 110 by a delivery conveyor 111 mounted on a framework 112 at the rear of the trailer framework 31. The delivery conveyor comprises endless chains having flights 114 thereon which advance the nuts along a foraminous base plate 115 formed of expanded metal or the like. Preferably, a wagon is hitched to the trailer frame 31 to underlie the free extremity of the delivery conveyor 111 so as to receive the nuts discharged by the conveyor. As shown in Figs. 1 to 3, the conveyor 111 is driven from the shaft 36 through an idler shaft 117 which drives the drive sprocket shaft 118 of the conveyor by means of a chain 119.

As stated earlier, a guard 120 is mounted on the tractor to protect the operator from low hanging branches and other obstructions. Likewise, a canopy 121 is mounted over the trailer frame 31 to protect the machinery from damage due to dropping nuts and branches.

While a particular embodiment of the present invention has been herein illustrated and described, it is not intended to limit the invention to such disclosure, but changes and modifications may be made therein and thereto within the scope of the following claims.

I claim:
1. A mobile nut harvesting unit for travel upon the ground surface comprising a mobile frame; pick-up means at the trailing end of said frame including elongated elevator means pivotally supported at one end on said frame at an elevated location above the ground; slide shoes mounted at the other end of said elevator means for sliding on the ground surface; and auxiliary baffle means mounted on said slide shoes adjacent said elevator means at said other end operable to engage the nuts on the ground surface and to displace the same onto said elevator means.

2. A harvesting unit according to claim 1 including a tension spring between said frame and said elevator means partially and resiliently supporting said elevator means at said other end to partially counterbalance the weight of said elevator means and afford free sliding movement of said slide shoes on the ground surface.

3. A harvesting unit according to claim 2 including a linkage on said unit mounting said spring and means to actuate said linkage to supplement said spring and thereby pivotally displace said elevator means to disengage and elevate said slide shoes from the ground.

4. A harvesting unit according to claim 3 wherein said auxiliary baffle means comprises a pick-up conveyor mounted on said slide shoes for rotary movement counterdirectional to said elevator means.

5. A harvesting unit according to claim 4 wherein said pick-up conveyor is pivotally mounted on said silde shoes at one end and rests upon said slide shoes at the other end, said conveyor including a resilient tension spring partially counteracting the weight thereof.

6. A harvesting unit according to claim 5 wherein said pick-up conveyor comprises an endless series of parallel tubular elements, selected elements of which having radially projecting drag teeth disposed at spaced intervals along the length thereof, and means to advance said series counterdirectional to said pick-up elevator means whereby confronting runs of said conveyor and elevator means travel in the same direction.

References Cited in the file of this patent

UNITED STATES PATENTS

| | | |
|---|---|---|
| 491,278 | Bertram | Feb. 7, 1893 |
| 947,963 | Cable | Feb. 1, 1910 |
| 1,579,509 | Brown | Apr. 6, 1926 |
| 2,508,454 | Goodwin | May 23, 1950 |
| 2,557,475 | Schieman | June 19, 1951 |
| 2,639,573 | McLaughlin | May 26, 1953 |
| 2,643,754 | Doak | June 30, 1953 |
| 2,657,408 | Machovec | Nov. 3, 1953 |
| 2,679,133 | Sodeholm | May 23, 1954 |
| 2,708,380 | Antos et al. | May 17, 1955 |
| 2,780,904 | Bowie et al. | Feb. 12, 1957 |

OTHER REFERENCES

American Tung News, vol. 5, No. 6, June 1954, pages 6 and 7.